United States Patent
Bergy et al.

[15] 3,679,787

[45] July 25, 1972

[54] ANTIBIOTIC PROCESS OF TREATMENT

[72] Inventors: Malcolm E. Bergy, Kalamazoo; Ross R. Herr; Donald J. Mason, both of Portage, all of Mich.

[73] Assignee: The Upjohn Company, Kalamazoo, Mich.

[22] Filed: Aug. 6, 1970

[21] Appl. No.: 61,858

Related U.S. Application Data

[63] Continuation of Ser. No. 731,679, May 17, 1968, abandoned, which is a continuation of Ser. No. 833,861, June 2, 1969, abandoned, Continuation-in-part of Ser. No. 517,453, Dec. 29, 1965, abandoned, which is a continuation-in-part of Ser. Nos. 398,060, Sept. 21, 1965, Pat. No. 3,261,687, and Ser. No. 134,843, Aug. 30, 1961, Pat. No. 3,155,580.

[52] U.S. Cl. .............................................. 424/181, 424/283
[51] Int. Cl. ......................................................... A61k 21/00
[58] Field of Search .......................................... 424/181, 283

[56] References Cited

UNITED STATES PATENTS 3,261,687   7/1966   Bergy et al. ................................... 99/2

OTHER PUBLICATIONS

Goldberg, Antibiotics, D. Van. Nortrand Co., Inc. Princeton, N.J., April 1960, pages 177–179

*Primary Examiner*—Jerome D. Goldberg
*Attorney*—John J. Killinger

[57] ABSTRACT

The combination of lincomycin and spectinomycin, in unit dosage form, in combination with pharmaceutical carriers: useful in treating diseased animals and exhibiting synergistic activity against mycoplasma infections e.g. PPLO and L forms.

3 Claims, No Drawings

ANTIBIOTIC PROCESS OF TREATMENT

CROSS REFERENCES TO RELATED APPLICATIONS

This application is a continuation of application Ser. No. 731,679, filed May 17, 1968, now abandoned, which in turn is a continuation of application Ser. No. 833,681, filed June 2, 1969, now abandoned, which in turn is a continuation-in-part of application Ser. No. 517,453, filed Dec. 29, 1965, now abandoned which in turn is a continuation-in-part of application Ser. No. 398,060, filed Sept. 21, 1964, now U.S. Pat. No. 3,261,687, and application Ser. No. 134,843, filed Aug. 30, 1961, now U.S. Pat. No. 3,155,580.

BRIEF SUMMARY OF INVENTION

This invention relates to therapeutic compositions containing a combination of antibiotics and, more particularly, to compositions comprising lincomycin and spectinomycin prepared in unit dosage form in association with a pharmaceutical carrier and to the process of treating diseased animals.

DETAILED DESCRIPTION

The combination of lincomycin and spectinomycin can be employed with a high degree of efficacy in the treatment of a variety of infections known to be susceptible to the individual antibiotics, in which conditions the desired clinical results can be obtained, said clinical results being otherwise unobtainable were the antibiotics to be administered singly. That is, where certain side reactions have been observed with the administration of the individual antibiotics, it is now possible by the administration of the combination of the two antibiotics to avoid the untoward reactions. For example, following the oral administration of lincomycin for the treatment of systemic infection, there is observed an overgrowth of enterococci; the combined oral administration of lincomycin and spectinomycin controls this undesirable overgrowth. Another particularly advantageous application of the combination, is in the treatment of various infection due to mycoplasma, for example in kidney infections when there are L forms of gram-negative and gram-positive bacteria present. Similarly, the composition also shows synergistic activity against PPLO infections as has been demonstrated in chickens infected with Mycoplasma gallisepticum and treated by intramuscular injections of the composition.

The term "lincomycin" as used herein shall be taken to mean lincomycin free base and the pharmacologically acceptable acid addition salts thereof. The free base and salts thereof can be prepared as described in U.S. Pat. 3,086,912.

As used in the specifications and claims, the term spectinomycin shall be taken to mean spectinomycin free base and the pharmacologically acceptable acid addition salts thereof.

Spectinomycin is a non-proprietary name adopted by the American Medical Association United States Pharmacopeia Nomenclature Committee of J. A. M. A. Vol. 182, No. 7, p. 733 (Nov. 17, 1962). The antibiotic is also referred to in the literature as actinospectacin.

Spectinomycin and the salts thereof can be prepared as described in South African Pat. No. 604,098; Belgium Pat. No. 596,175; and U. S. Application, Ser. No. 847,092, filed Oct. 20, 1959, wherein said references, spectinomycin is called actinospectacin.

The combination of lincomycin and spectinomycin is useful in combating many bacterial, including L forms, infections in man and animals. For these uses, the antibiotic compounds are dispersed in a pharmaceutically acceptable carrier which may be either a solid material, powder, or a liquid. The compositions can take the form of tablets, powders, wafers, cachets, granules, pills, capsules (both hard and soft gelatin), dispersions in edible oils, aqueous dispersions or other dosage forms which are particularly useful for oral administration. Liquid diluents are employed in sterile conditions for parenteral use. The liquid media can be a sterile solvent or a sterile suspending vehicle containing, for example, injectable oils or water. Aqueous vehicles can contain hydrophilic colloids such as methylcellulose, polyvinyl pyrrolidone, gelatin, tragacanth, and the like. The antibiotic compounds can be admixed with solid diluents and/or tableting adjuvants such as corn starch, lactose, talc, stearic acid, magnesium stearate, gums, and the like. Any of the capsulating or tableting materials used in pharmaceutical practice can be employed where there is no incompatibility with the antibiotics, and the materials can be tableted with or without adjuvants. Alternatively, the antibiotics can be enclosed in the usual capsule or resorbable material such as the conventional gelatin capsule and administered in that form. In yet another embodiment, the antibiotics can be put up in powder packets and so employed. Or, the antibiotic combination can be compounded in the form of a palatable suspension in a suitable fixed oil containing, for example, about 2 percent aluminum momostearate as a suspending agent. Such a suspension can be given orally or can be capsulated. The antibiotics in the form of ointments, including a petrolatum type grease base, creams, water-oil emulsions and lotions are useful topically; other topical formulations include nosedrops, sprays, troches, and suppositories. For veterinary use, the combination is useful in the form appropriate for the animal to be treated.

The term "unit dosage form" as used in the specification and claims refers to physically discrete units suitable as unitary dosages, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effort to be achieved, and (b) the limitations inherent in the art of compounding such an active material for therapeutic use, as disclosed in detail in this specification, these being features of the present invention. Examples of suitable oral unit dosage forms in accord with this invention are tablets, capsules, pills, powder packets, wafers, cachets, teaspoonfuls, tablespoonfuls, dropperfuls, segregated multiples of any of the foregoing, and other forms as hereinafter described.

As noted hereinbefore, use of the lincomycin-spectinomycin combinations of the present invention presents the advantage in a number of clinical conditions. The dosage of the antibiotic combination must, or course, be determined in accord with the patient's age, weight and condition, as well as with regard for the particular infection or type of infection being treated. For convenient and effective administration of the antibiotic combination of this invention, lincomycin can be present in the selected dosage form in amounts ranging from about 50 to about 1000 mg., and spectinomycin in amounts ranging from about 50 to about 1000 mg. per unit dose. Preferably, a dosage form containing in each unit from about 100 to about 500 mg. of lincomycin and from about 100 to about 500 mg. of spectinomycin is employed. Capsules or tablets containing 250 mg. of lincomycin and 250 mg. of spectinomycin, for example, given on a schedule of one or two capsules or tablets three or four times daily are effective in susceptible conditions. In general, the activity of this combination is observed on a regimen comprising dosage units containing from about 25 to about 75 parts by weight of lincomycin together with from about 75 to about 25 parts by weight of spectinomycin.

The following examples are illustrative of the best mode contemplated by the inventors for carrying out their invention and are not to be construed as limiting.

EXAMPLE 1 CAPSULES

One thousand two-piece hard gelatin capsules for oral use, each containing 250 mg. of lincomycin hydrochloride and 150 mg. of spectinomycin sulfate are prepared from the following types and amounts of materials:

| | |
|---|---|
| Lincomycin hydrochloride | 250 gm. |
| Spectinomycin Sulfate | 150 gm. |
| Corn starch | 60 gm. |
| Talc | 40 gm. |
| Magnesium stearate | 5 gm. |

The materials are thoroughly mixed and then encapsulated in the usual manner.

The foregoing capsules are useful for the treatment of infection in adult humans by the oral administration of one capsule every four hours.

Using the procedure above, capsules are similarly prepared containing spectinomycin sulfate in 50, 100 and 250 mg. amounts by substituting 50, 100 and 250 gm. of spectinomycin sulfate for the 150 gm. used above.

EXAMPLE 2 CAPSULES 1000 two-piece hard gelatin capsules for oral use, each containing 500 mg. of lincomycin hydrochloride and 250 mg. of spectinomycin sulfate are prepared from the following types and amounts of ingredients:

| | |
|---|---|
| Lincomycin hydrochloride | 500 gm. |
| Spectinomycin Sulfate | 250 gm. |
| Talc | 75 gm. |
| Magnesium stearate | 25 gm. |

The ingredients are thoroughly mixed and then encapsulated in the usual manner.

The foregoing capsules are useful for the treatment of infection in large dogs by the oral administration of one capsule every six hours.

EXAMPLE 3 TABLETS 1000 tablets for oral use, each containing 250 mg. of lincomycin hydrochloride and 250 mg. of spectinomycin sulfate are prepared from the following types and amounts of materials:

| | |
|---|---|
| Lincomycin hydrochloride | 250 gm. |
| Spectinomycin Sulfate | 250 gm. |
| Lactose | 125 gm. |
| Corn starch | 65 gm. |
| Magnesium stearate | 25 gm. |
| Light liquid petrolatum | 3 gm. |

The ingredients are thoroughly mixed and slugged. The slugs are broken down by forcing through a number sixteen screen. The resulting granules are then compressed into tablets, each tablet containing 250 mg. of lincomycin hydrochloride and 250 mg. of spectinomycin sulfate.

The foregoing tablets are useful for systemic treatment of infections in adult humans by oral administration of one tablet every four hours.

Using the above procedure, tablets are similarly prepared containing spectinomycin sulfate in 100 and 500 mg. amounts by substituting 100 and 500 gm. of spectinomycin sulfate for the 250 gm. used above.

EXAMPLE 4 CAPSULES 10,000 two-piece hard gelatin capsules for oral use, each containing 125 mg. of lincomycin hydrochloride and 200 mg. of spectinomycin sulfate are prepared from the following types and amounts of materials:

| | |
|---|---|
| Lincomycin hydrochloride | 1250 gm. |
| Spectinomycin Sulfate | 2000 gm. |
| Corn starch, U. S. P. | 750 gm. |
| White mineral oil, U. S. P. | 100 gm. |
| Magnesium stearate, powder | 50 gm. |
| Talc, U. S. P. | 100 gm. |

The finely powdered ingredients are thoroughly mixed and capsulated in the usual manner.

EXAMPLE 5 CAPSULES 10,000 two-piece hard gelatin capsules for oral use, each containing 125 mg. of lincomycin hydrochloride and 250 mg. of spectinomycin sulfate are prepared from the following types and amounts of materials:

| | |
|---|---|
| Lincomycin hydrochloride | 1250 gm. |
| Spectinomycin Sulfate | 2500 gm. |
| Magnesium stearate, powder | 100 gm. |
| White mineral oil, U. S. P. | 20 gm. |
| Starch, bolted, dried, q.s. | |

The finely ground ingredients are thoroughly mixed, slugged, screened and capsulated in the usual manner.

EXAMPLE 6 CAPSULES 10,000 two-piece hard gelatin capsules for oral use, each containing 60 mg. of lincomycin, hydrochloride, and 60 mg. of spectinomycin sulfate, are prepared from the following types and amounts of materials:

| | |
|---|---|
| Lincomycin hydrochloride | 600 gm. |
| Spectinomycin Sulfate | 600 gm. |
| Magnesium stearate, powder | 25 gm. |
| White mineral oil, U. S. P. | 5 gm. |
| Starch, bolted, dried, q.s. | |

The finely ground ingredients are thoroughly mixed, slugged, screened and capsulated in the usual manner. This formulation is useful for treatment of infection, particularly in dogs and cats at a dose of one or two capsules three times daily.

EXAMPLE 7 TABLETS 10,000 oral tablets, each containing 125 mg. of lincomycin hydrochloride and 125 mg. of spectinomycin sulfate are prepared from the following types and amounts of materials:

| | |
|---|---|
| Lincomycin hydrochloride | 1250 gm. |
| Spectinomycin Sulfate | 1250 gm. |
| Lactose, U. S. P. | 450 gm. |
| Corn starch, U. S. P. | 450 gm. |
| Calcium stearate, powder | 5 gm. |
| White mineral oil, U. S. P. | 100 gm. |

The materials are thoroughly mixed and slugged. The slugs are broken down by forcing through a No. 16 screen. The resulting granules are then compressed into tablets in the usual manner.

EXAMPLE 8 STERILE AQUEOUS SOLUTION

A sterile aqueous solution of lincomycin hydrochloride and spectinomycin sulfate is prepared from the following types and amounts of materials:

| | |
|---|---|
| Lincomycin hydrochloride | 100 mg. |
| Spectinomycin Sulfate | 100 mg. |
| Polythylene glycol 4000 | 30 mg. |
| Polysorbate, 80, U. S. P. (polyoxyethylene-[20]-sorbitan monooleate) | 4 mg. |
| Propylparaben | 0.42 mg. |
| Water for injection, U. S. P. q. s. | 1 ml. |

The sterile antibiotics are dispersed in the sterile vehicle. Each milliliter of the finished preparation contains 100 mg. each of lincomycin hydrochloride and spectinomycin sulfate and is suitable for parenteral use.

EXAMPLE 9

A sterile aqueous solution containing 300 mg. of lincomycin hydrochloride and 400 mg. of spectinomycin sulfate in each 2 cc is prepared from the following types and amounts of ingredients:

| Lincomycin hydrochloride | 300 gm. |
| Spectinomycin Sulfate | 400 gm. |
| Benzyl alcohol | 20 cc |
| Water for injection | 2000 cc |

The antibiotics and benzyl alcohol are dissolved in the water for injection. The solution is sterilized by filtration through sterilizing filter. One thousand 2 cc vials are filled and sealed. The foregoing steps are carried out under a nitrogen atmosphere. This composition is useful in 2 cc dose intramuscularly for treatment of kidney infection.

EXAMPLE 10

Following the procedure of each of the preceding Examples 1 through 9, inclusive, one each of lincomycin sulfate, lincomycin nitrate, lincomycin phosphate, lincomycin citrate, lincomycin lactate, lincomycin acetate, lincomycin tartrate, and lincomycin succinate, is substituted in an equivalent amount for the lincomycin hydrochloride shown in the example to provide similar therapeutic properties.

EXAMPLE 11

Following the procedure of each of the preceding Examples 1 through 9 inclusive, one each of spectinomycin hydrochloride, spectinomycin nitrate, spectinomycin phosphate, spectinomycin citrate, spectinomycin acetate, spectinomycin succinate, and spectinomycin maleate is substituted in an equivalent amount for the spectinomycin sulfate shown in the example to provide similar therapeutic properties.

What is claimed is:

1. A process for the therapeutic treatment of an animal hosting mycoplasma infection comprising the administration to said host of an effective antimycoplasma infection amount of the composition, in unit dosage form, from about 50 to about 1000 mg. of lincomycin and from about 50 to 1000 mg of spectinomycin dispersed in a pharmaceutical carrier and wherein the ratio of lincomycin and spectinomycin is from about 25 to about 75 parts by weight of lincomycin to about 75 to about 25 parts by weight of spectinomycin.

2. The process of claim 1 wherein the animal is hosting a PPLO organism.

3. The process of claim 1 wherein the carrier is a sterile parenteral vehicle.

* * * * *